F. F. WEAR.
COFFEE REFINER AND GRADER.
APPLICATION FILED DEC. 6, 1911.
1,039,854.
Patented Oct. 1, 1912.
2 SHEETS—SHEET 1.
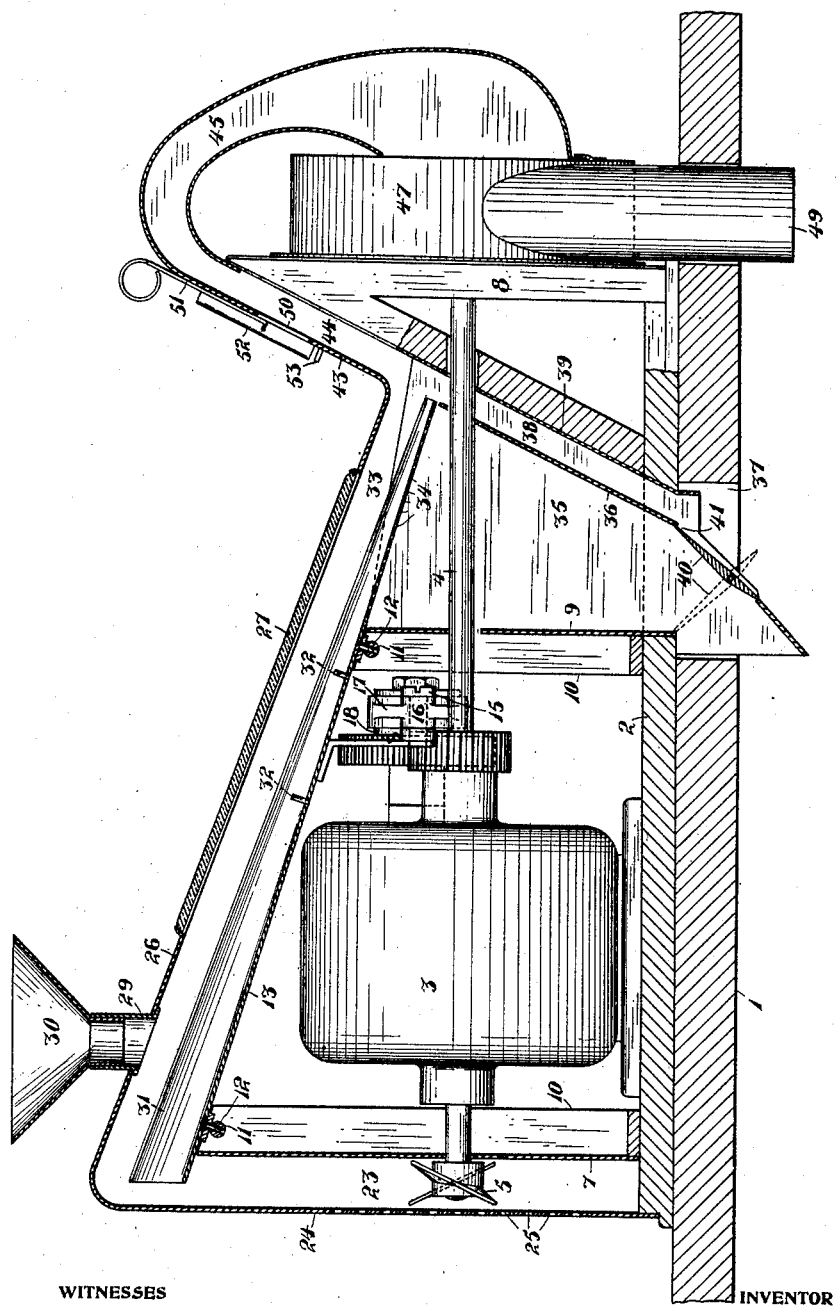

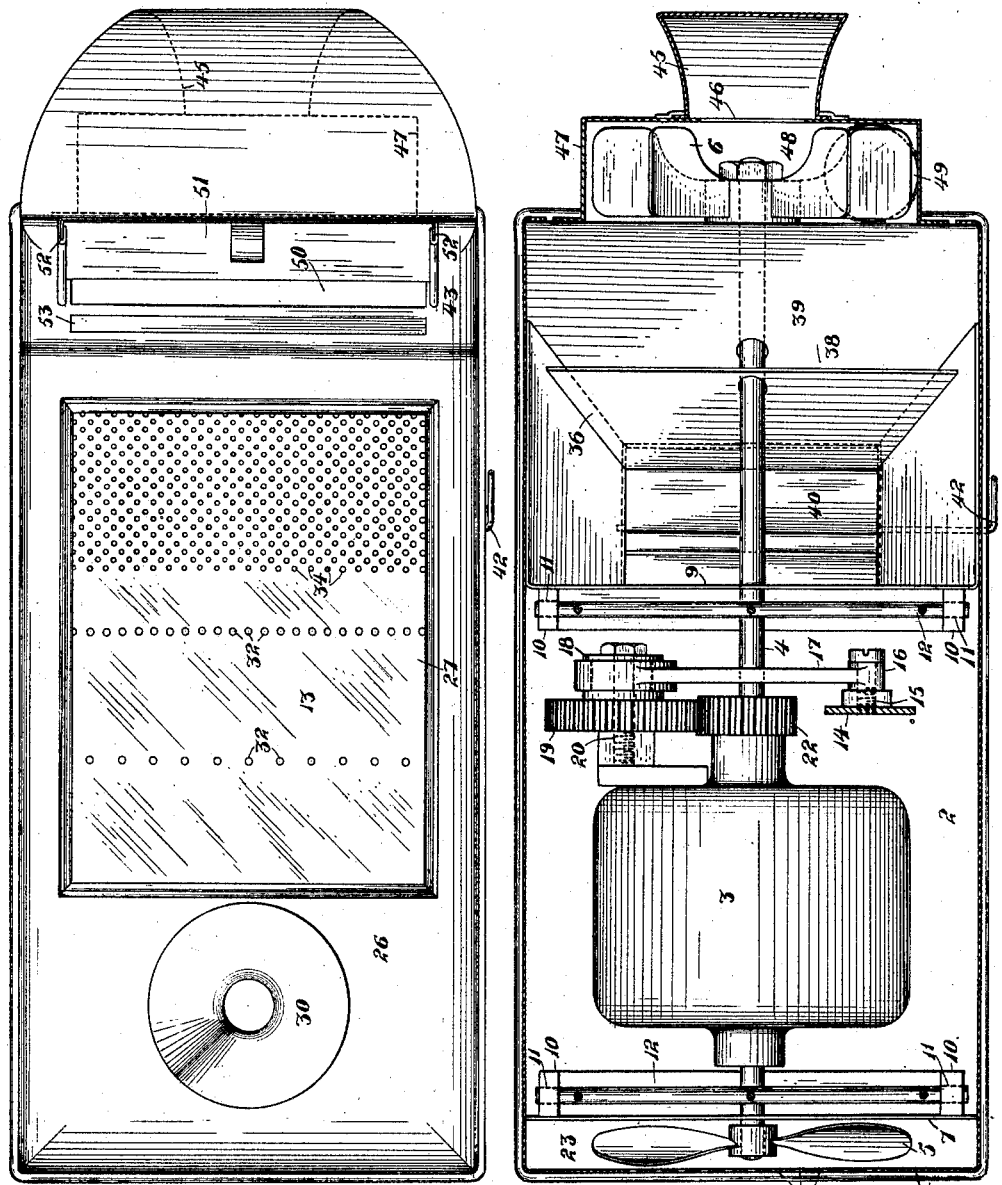

UNITED STATES PATENT OFFICE.

FRANK F. WEAR, OF SAN FRANCISCO, CALIFORNIA.

COFFEE REFINER AND GRADER.

1,039,854.            Specification of Letters Patent.       Patented Oct. 1, 1912.

Application filed December 6, 1911. Serial No. 664,245.

*To all whom it may concern:*

Be it known that I, FRANK F. WEAR, a citizen of the United States, residing at San Francisco, in the county of San Francisco and State of California, have invented new and useful Improvements in Coffee Refiners and Graders, of which the following is a specification.

The present invention relates to an improved coffee refiner, the object of the invention being to provide a device for separating chaff from coffee which will be simple in construction, compact in form, effective in operation and convenient in use.

In the accompanying drawings, Figure 1 is a vertical longitudinal section, certain parts being shown in side elevation; Fig. 2 is a top plan view thereof; Fig. 3 is a plan view with the casing and shaker removed.

Referring to the drawing, 1 indicates a table or other support upon which rests a base 2. Upon said base is supported an electric motor 3 having a shaft 4, which extends beyond the motor a short distance at one end and a much longer distance at the other. At the former end said shaft carries a blower 5, while at the latter end it carries a suction fan 6. The shorter end of the shaft passes through an upright wall or plate 7 while the longer end extends through an upright plate 8. Attached to said plate 7 and also to a vertical wall or plate 9 secured to said base, are uprights 10, in the upper terminal portions of which are apertures or bearings 11, in which can slide rods 12. Secured to said rods is a shaker 13, which, on account of the uprights 10 attached to the plate 9 being considerably shorter than those attached to the plate 7, slopes downwardly toward the longer end of the shaft 4. To reciprocate said shaker there is attached thereto one end of a bracket 14, the other end of which is attached to a wrist 15 having a sleeve 16 which is attached to an arm 17 extending from an eccentric 18 secured to a gear wheel 19 rotating on a stud shaft 20, secured to, and extending from the motor casing. Said gear wheel 19 meshes with a gear wheel 22 on the motor shaft. By this means, from the rotation of the motor shaft there is obtained a rapid transverse reciprocation of the shaker.

The blower 5 is contained within a pressure chamber 23 formed by the wall 7 and a casing 24, said casing being perforated, as shown at 25, to permit the air to pass therethrough. Said casing extends over, and incloses, said shaker, and in an upper portion 26 thereof, sloping downwardly substantially parallel with the shaker, there is contained a window 27 through which the hereinafter described action on the ground coffee may be inspected. Connected with an aperture in said downwardly sloping portion of the casing is a tube 29, in which is inserted the lower end of a funnel 30. Ground coffee deposited in said funnel falls on to said shaker, the longitudinal margins of which are curled over, as shown at 31, to confine the coffee laterally. By the reciprocating motion of said shaker, said ground coffee is evenly distributed thereover, said distribution being aided by pins 32, preferably arranged in rows and of any suitable number and position. By the blower 5 there is produced a current of air which flows downwardly between the shaker and the sloping portion 26 of the casing, which current raises the chaff and other light particles from the ground coffee and impels said chaff to the lower end of the passage 33 between the shaker and the casing. The lower portion of the shaker is formed with a large number of small holes 34, through which the finer particles of coffee can fall into a chute 35 between the vertical wall 9 and an oblique wall 36 extending through a hole 37 in the table. The larger particles of coffee pass over the end of the shaker and fall down a passageway 38 between said oblique wall 36 and an oblique wall 39. Below the chute is pivoted a gate 40, which, in the position shown in full lines in Fig. 1, closes an opening 41 in said oblique wall and compels the finer particles to be discharged in a different direction from the coarser particles, which drop from the bottom of the passageway 38. When the gate is placed in the position shown in dotted lines, both the coarse and fine particles are discharged in the same direction. Said gate is controlled by a conveniently located handle 42.

The casing is extended upwardly (as shown at 43) almost at right angles with the downwardly sloping portion 26 and substantially parallel with the plate or wall 39 to form an oblique upwardly extending conduit 44, and the casing is also formed with a conduit 45 leading from the conduit 44, and terminating at an aperture 46 through the side of a casing 47 secured to the plate and surrounding the suction fan 6 to form a suction chamber 48, the lower edge of said conduit fitting within a groove formed on the side of said auxiliary casing. Said suction chamber has a downwardly directed discharge conduit 49 passing through a hole in the table. Through said upwardly extending portion 43 of the casing, is formed a transversely elongated aperture 50, over which can slide a door 51 moving in slideways 52 and adapted to be limited by a stop 53.

The mode of operation of my improved coffee cleaner will be readily understood from the foregoing description. The ground coffee supplied through the funnel 30 falls on to, and descends on, the shaker 13, being distributed evenly thereover by its transverse reciprocations assisted by the pins 32. The current of air produced by the blower flows over said downwardly flowing stream of coffee so that the chaff is raised from said stream and is carried by the air to the oblique conduit 44. On arriving at said conduit it meets the upward current of air produced from the suction fan, and is immediately drawn up into said conduit 44 and carried into the suction chamber 46, being discharged therefrom through the downwardly directed conduit 49 into any suitable container. In the meantime, as the ground coffee flows over the perforated portion of the shaker, its fine particles pass through said perforations, while the coarse particles descend on the shaker to the lower end thereof, whence they fall into the passage 38.

It is of great importance that the means for producing suction be accurately adjusted, for, if the suction produced by the suction fan be too great, it will carry off some of the fine particles of coffee as well as the chaff, which coffee will therefore be wasted, whereas, if the suction be too small, some of the chaff will not be eliminated from the coffee. The glass window 27 is provided so that the action of the machine can be closely inspected, to determine whether the apparatus is operating efficiently. If the suction is too great it may be reduced by moving the door 51 to open to a greater extent the opening 50, thereby letting in a greater volume of air through said opening and correspondingly reducing the suction at the lower end of the shaker. If the suction is too small, the shutter is correspondingly closed.

The casing can be lifted directly upward from the base, the open end of the conduit 45 sliding vertically against a wall of the auxiliary casing 47, so that the parts will be open for inspection, cleaning, and repair.

I claim:—

The combination of a downwardly sloping shaker perforated in its lower portion, means for shaking said shaker, means for directing a supply of ground coffee on to the uppermost portion thereof, a blower adjacent to the upper end of said shaker, means for directing the current of air from said blower downwardly over and in close proximity to said shaker, an air conduit leading upwardly from the lower end of said shaker, means for producing upward suction in said conduit, separate conduits for the streams of coffee respectively falling through said perforations, and dropping from the end of the shaker, and a gate movable to one position to maintain separate said streams and to another position to cause them to unite.

In testimony whereof I have hereunto set my hand in the presence of two subscribing witnesses.

FRANK F. WEAR.

Witnesses:
  FRANCIS M. WRIGHT,
  D. B. RICHARDS.

Copies of this patent may be obtained for five cents each, by addressing the "Commissioner of Patents, Washington, D. C."